United States Patent [19]
Franaszek et al.

[11] Patent Number: 6,077,160
[45] Date of Patent: Jun. 20, 2000

[54] METHOD AND APPARATUS FOR RIPENING PRODUCTS IN A TEMPERATURE-CONTROLLED ROOM

[75] Inventors: Stanislaw Franaszek, Tulln, Austria; Grzegorz Pawel Mizera, Legnicka, Poland

[73] Assignee: Chiquita Brands, Inc., Cincinnati, Ohio

[21] Appl. No.: 09/291,887

[22] Filed: Apr. 14, 1999

Related U.S. Application Data

[62] Division of application No. 08/781,824, Jan. 10, 1997, Pat. No. 5,899,084.

[51] Int. Cl.⁷ .................................................. F24F 7/06
[52] U.S. Cl. ........................................ 454/292; 62/419
[58] Field of Search ........................... 62/407, 413, 418, 62/404, 419, 89, 78, 414, 417, 426; 454/292, 88, 118, 284, 301

[56] References Cited

U.S. PATENT DOCUMENTS

| | | |
|---|---|---|
| 1,817,875 | 8/1931 | Broadbent . |
| 1,938,889 | 12/1933 | Bloom ................................. 99/2 |
| 1,973,022 | 9/1934 | Strobell .......................... 62/419 X |
| 2,467,633 | 4/1949 | Scott .............................. 62/419 X |
| 2,496,652 | 2/1950 | Ahrens ........................... 62/414 X |
| 2,734,444 | 2/1956 | Lunn, Jr. et al. ................ 454/118 |
| 3,067,522 | 12/1962 | Teigen ............................... 34/27 |
| 3,103,796 | 9/1963 | Dickson et al. ................. 62/419 X |
| 3,301,482 | 1/1967 | Bullen ............................. 236/46 |
| 4,261,519 | 4/1981 | Ester .............................. 62/418 X |
| 4,583,454 | 4/1986 | Huang et al. ....................... 99/468 |
| 4,697,429 | 10/1987 | Chandler et al. ................... 62/203 |
| 4,767,629 | 8/1988 | Iglesias et al. ..................... 426/55 |
| 4,925,089 | 5/1990 | Chaparro et al. ................ 236/78 D |
| 4,934,151 | 6/1990 | Shima ............................... 62/64 |
| 5,343,712 | 9/1994 | Gowan ............................ 62/126 |

FOREIGN PATENT DOCUMENTS

| | | |
|---|---|---|
| 0357587 | 3/1990 | European Pat. Off. . |
| 1102510 | 10/1955 | France . |
| 2138155 | 12/1972 | France . |
| 4224016 | 1/1994 | Germany . |
| 1083034 | 3/1984 | U.S.S.R. ......................... 454/284 |
| 411188 | 6/1934 | United Kingdom . |
| 479233 | 2/1938 | United Kingdom . |
| WO 9500030 | 1/1995 | WIPO . |

Primary Examiner—Harry B. Tanner
Attorney, Agent, or Firm—Frost & Jacobs LLP

[57] ABSTRACT

A ripening room is disclosed for ripening perishable products, such as fruits and vegetables, and more particularly bananas, in which the air flow and temperature are closely controlled by the room construction and by a cooling control system that archives uniform ripening of the fruit regardless of the physical location of the fruit within the room. These desired results are accomplished using a minimum quantity of energy and cooling capacity by use of an improved cooling controller that gradually changes the temperature setpoint over time to allow the cooling (refrigeration) system to operate near its full capacity without any periods of intense cooling (due to sudden changes of the temperature setpoint, as in the prior art). The uniform ripening is also achieved by an improved air distribution system that provides a greater back pressure in portions of a ripening room that, in conventional designs, receives far too much air flow.

9 Claims, 10 Drawing Sheets

METHOD AND APPARATUS FOR RIPENING PRODUCTS IN A TEMPERATURE-CONTROLLED ROOM

TECHNICAL FIELD

This application is a division of application Ser. No. 08/781,824 filed Jan. 10, 1997, now U.S. Pat. No. 5,899,084.

The present invention relates generally to temperature control and air flow control equipment and is particularly directed to the construction of a room and design of a cooling system for ripening perishable products such as fruits and vegetables. The invention is specifically disclosed as a ripening room for bananas in which the air flow and temperature are closely controlled to achieve uniform ripening of the fruit regardless of the physical location of the fruit within the room, and to accomplish the desired results using a minimum quantity of energy and cooling capacity.

BACKGROUND OF THE INVENTION

Ripening processes and ripening rooms, broadly defined as including ripening rooms, chambers, or truck containers, are generally known and have been used for many years in the fruit industry for ripening fruit, such as bananas. One important working principle in ripening room construction is that air pressure and air flow should be uniform throughout the air flow circuit in the room, which typically extends from above boxes and pallets containing bananas, through air flow pathways that circulate through the banana boxes, and back to ventilating fans, in order to effect uniform ripening of all bananas in the room.

Conventional ripening rooms are usually of either a "chamber" or truck "container" variety and typically comprise an operational area and a cooling area. In conventional ripening chambers, perishable fruit, such as bananas, are stacked on pallets or in boxes in a configuration known as a "tight-stack", in which two or more rows of tightly stacked boxes separated by a corridor are spaced-apart from the side walls of the chamber, while being positioned in the operational space of a substantially enclosed ripening room having generally rectangular walls, floor, and ceiling. In truck containers, the boxes are generally stacked in what is known as a "pyramid stack," in which each box in each row is spaced-apart from the next box in that row and the rows are also spaced-apart from each other, such that spaces are provided about all sides of the boxes. The next level of boxes in a pyramid stack would not be placed directly over the boxes below it, but rather would be placed off-center, so that each box is partially stacked on top of two boxes below it, in typical pyramid fashion.

Boxes containing bananas typically have holes in them to encourage air circulation about the bananas. The ripening room is generally supplied with air which is cooled by a refrigeration system, in order to maintain a predetermined fruit temperature. The cooled air is circulated throughout the substantially enclosed room at discretely controlled temperatures for a fixed length of time, until the bananas ripen.

A typical ripening cycle would likely include a period of gassing in which ethylene gas, for example, is introduced into and circulated throughout the room at a fixed setpoint temperature, followed by a period of air circulation in which forced air (along with the ethylene mixture) is circulated throughout the room or container. Some of the ethylene gas may then be removed, followed by a relatively long period where air is circulated by the fan(s) while the setpoint temperature of the supplied air is lowered in discrete steps by a thermostatic controller. The thermostatic controllers for conventional ripening programs typically provide for distinct and sudden drops in the setpoint temperature at certain time intervals. For example, in a conventional four day ripening cycle, the air temperature setpoint temperature might be set to 18° C. for two days, then instantaneously drop to 16.5° C. for one day, and again instantaneously drop to 14.5° C. for the final day.

Refrigeration systems have been used for many years of the type which use a compressor to provide a "refrigerant" also known as "coolant" flowing through a closed-loop system. The compressor increases both the pressure and the temperature of the vaporous refrigerant before the refrigerant is directed into a condenser. As it passes through the condenser, the vaporous refrigerant is cooled and condensed to a liquid, while releasing heat to the surrounding environment, usually with the aid of a fan. The liquid refrigerant is then directed to a thermal expansion valve which provides a somewhat controlled release of the high pressure liquid refrigerant into a series of coils, commonly called an evaporator. As it passes through the thermal expansion valve, the liquid refrigerant undergoes a change of state from a high pressure liquid to a lower pressure vapor, while extracting thermal energy from the atmosphere surrounding the evaporator. The vaporous refrigerant is then drawn into the compressor to close the loop and to restart the refrigeration process cycle.

The typical conventional ripening room cooling system operates in an on/off switching mode, in which cooling capacity variations are made by a solenoid valve, thereby shortening or extending the supply time of the cooling agent to the cooler. Changes in the cooling requirements and ambient temperature conditions throughout the ripening process affect the variable coolant evaporation temperature. However, conventional banana ripening rooms function based on a constant evaporation temperature, which may be set to a constant by a back pressure regulation valve in the suction line, calculated for the maximum capacity requirement of cooling during the peak of fruit respiration. As a result, conventional ripening room cooling control systems operate inefficiently.

The rear of the room (i.e., chamber or container) has a "cooling area," separated from the "operational area," which contains the refrigeration system that cools the air before it is supplied to the operational area of the room. Conventional cooling systems for ripening bananas generally consist of one or more air coolers with fans placed on a "supplemental" wall dividing the cooling area from the operational area, or under a roof in front of a supplemental wall toward the rear of the ripening room. The forced air fans are often placed behind the cooler in conventional ripening systems. In one example of a conventional ripening room, the supplemental wall closing off the cooling area from the operational area is a "reeled roller blind," which comprises a tarp that rolls on to and off of a rod much like a window shade, and which separates the chamber space into areas of high pressure and low pressure.

In conventional ripening rooms using a tight-stack configuration a typical air flow circuit path supplies air into an operational area over the top of the boxes (which may be partially or fully covered on top by a tarp), down along the spaces between the sides of the room and the banana boxes, through the holes of the sides of the boxed bananas, and into the corridor between the two rows of tightly stacked boxes. The air flow circuit then returns the air to a cooling area in the rear of the room behind the supplemental wall, where the air passes through a cooler/evaporator in the cooling area, through one or more fans between the cooling area and the operational area, and returns the air to the operational area where the bananas are stacked. This configuration is sometimes referred to as a "Del Monte" ripening room.

In conventional ripening containers using a pyramid stack configuration, the container is similarly divided into an operational area where the boxes are stacked, and a cooling area where the forced air is cooled. In this stacking configuration, some of the boxes typically are placed against the side walls of the operational area of the ripening container. A typical air flow circuit path in a pyramid stack configuration forms a single large loop starting at the cooler in the cooling area at the rear of the ripening container, to the front of the container, then back to the cooling area. More specifically, the fans supply air into the operational area (and ultimately to the front of the ripening container), in and around the top portions of boxes through the spaces between the boxes and the holes in the boxes, and the air returns to the cooling area via the bottom portions of the boxes. While most of the supplied air reaches the front of the ripening container, some of this air bypasses the route and is essentially short-circuited into the bottom portions of the boxes. As with the tight-stack configuration, all of the air returns to the cooling area, then passes through the cooler, through the fans and back into the operational area.

The conventional ripening processes and rooms described above have exhibited several deficiencies which are known in the art but which, until now, have not been resolved. First, the bananas do not ripen uniformly and much of the fruit undergoes considerable shrinkage and lessened fruit quality when placed in conventionally constructed ripening rooms, because the cooling air does not circulate uniformly through the fruit. This lack of uniform air flow results in uneven air pressure, uneven cooling, and hence uneven ripening of the fruit. Whether the cooled air initially is forced over the top of the fruit or under the bottom of the fruit, the same circulation problem exists, particularly in chamber-type ripening rooms, because a relatively open free space separates the boxes from the conventionally constructed walls and ceiling of the room. As a result, the air flow is not equally distributed through all of the boxes.

For example, in a conventional tight-stack configuration, rather than descend along the sides of the ripening room walls, most of the air supplied from the fan(s) in the rear of the ripening room takes the path of least resistance, and passes over the fruit until reaching the front vertical wall (at the "far" end of the room from the fans), at which point the cooled air descends upon the bananas stacked near this front wall with a pressure that is greater than in other portions of the supply air pathway. The air is then drawn through the banana boxes by the same fan(s) in the rear of the ripening room. Because the higher air pressure in the front of the room causes the fruit situated there to receive a greater quantity of cooled air, those bananas stay greener in color, while the bananas in the middle and rear of the room remain at warmer temperatures and ripen to a yellow color much more quickly. The difference in the air pressure between the front and back of the ripening room is particularly pronounced in short ripening cycles. Consequently, a person entering the front of the room to check the ripeness of the bananas by color sees the green bananas and is misled into believing that the container or room is filled with unripe bananas.

Another problem associated with conventional cooling systems used for banana ripening is that they have operated in an "on/off" mode, where the temperature is controlled merely by turning the refrigeration system either "full" on or "full" off, rather than adjusting the amount or temperature of cooled air introduced into the operational area to some intermediate point. In such conventional cooling systems, the output cooling capacity is controlled, for example, by switching a solenoid valve either completely on or off to regulate the supply line of the cooling agent into the air cooler. Changes in fruit temperature during the ripening cycle are made by varying the setpoint temperature of the air in relatively large, sudden discrete steps, under the control of a temperature controller or automatic thermostat. These stepwise ripening programs used in the prior art are flawed, in that they tend to cause dehydration and undercooling of fruit, particularly where temperature sensors are placed in the boxes among banana clusters at the air outlet so that the time delay in the sensing feedback loop is much longer than necessary. Suddenly changing the setpoint temperature, for example, from 18.5° C. to 16.50° C. causes the refrigeration system to work at full capacity and induces intensive cooling for long time periods, considerable dehydration, and lowering of fruit ripening quality.

The evaporating temperature of refrigeration systems in conventional ripening rooms varies because of the change in cooling requirements during the ripening process and the change of ambient temperature conditions in the enclosed space. However, conventional systems operate using thermostatic expansion valves based on a constant evaporation temperature, by using a back pressure regulation valve which adds to the problem of low relative air humidity and fruit dehydration.

Finally, yet another shortcoming of the conventional ripening room processes and designs is that the cooling systems run inefficiently, thereby expending excessive energy. As related above, the air circulation in the conventional rooms used for banana ripening purposes have installed air coolers with air fans at the rear of the ripening room on a wall, or under a roof in front of a wall. The bananas are generally packed in bags and the bags are put into the boxes. Both the bags and the boxes have holes to allow circulation throughout the boxes among the bags of bananas. The air is cooled in only one basic circuit, namely, drawn by fans from the boxes in the operational space, through the cooler in the cooling space, and back into the operational space to form a single loop. Consequently, in the conventional one-loop configuration, a refrigeration system with excessive cooling capacity is required to cool the entire volume of air throughout the cooling cycle.

There is a need in the art for an improved room construction and cooling system used in ripening perishable products such as bananas, in which air flow is uniformly distributed, setpoint temperature is accurately controlled and gradually varied to reduce energy expenditure, thereby improving the quality of the ripened products located throughout the ripening room. By using the principles of the present invention, the shortcomings of the prior art are overcome while uniformity of ripened bananas in the entire ripening room, lowering of banana shrinkage, and better banana quality is achieved.

SUMMARY OF THE INVENTION

Accordingly, it is a primary object of the present invention to use an improved air distributor which provides stable, uniform air flow through all banana boxes regardless of their positions in the ripening room.

Another object of the present invention is to provide a ripening room cooling control system which can detect the properties of the coolant flowing at the outlet of the evaporator, and use that information in conjunction with information relating to the product, ambient, and setpoint temperatures, in order to control the coolant pressure, temperature, and release to the evaporator, so as to operate the system at an optimal or near-optimal energy usage rate.

Yet another object of the present invention is to provide a smooth and gradual variation of the setpoint temperature during the entire ripening process while also providing smooth control of evaporation temperature by a gradual change of evaporation pressure, so as to maintain minimum temperature differences between the fruit and the cooling air.

It is a further object of the present invention to provide a "cooling transformer" which provides greater efficiency than conventional cooling systems, thus allowing a smaller capacity cooling system to keep up with the heat of respiration.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with the purposes of the present invention, an improved ripening room design is provided in which bananas, in one embodiment, are tightly stacked in the operational space of a ripening room and a central cooler or refrigeration system is placed in the rear of the ripening room behind a wall. Features of the ripening room include an air distribution ceiling having a "V"-shaped air distributor to encourage uniform air pressure along the tops and sides of the banana boxes throughout the entire room, a very precise, smooth temperature setpoint controller, and an air mixing chamber that acts as a "cooling transformer" which provides for an energy-efficient temperature transfer of cooling air from a cooled air circuit of relatively small volume to a larger volume of air that circulates through the bananas. As many or as few of these features can be used individually or in combination to achieve desirable results.

In one embodiment of the present invention, air is drawn from a space between stacked pallets holding boxes of bananas into a space behind a wall that separates the ripening or "operational" area from a "cooling" area. The circulating air to be provided to the fruit is cooled by a refrigeration system located in the cooling area. The cooled air is blown into the air distribution space above the air distribution ceiling, and is guided into air distribution holes (i.e., passageways) by the "V"-shaped air distributor located above the air distribution ceiling and below the main ceiling of the ripening room, itself. The sizing of the distribution holes in the air distribution ceiling aid in the fine adjustment of air flow by decreasing each individual hole area as the holes proceed farther from the cooling area. In one embodiment, rather than providing multiple distribution holes, a single elongated distribution slot is located along each side of the air distribution ceiling in which each slot forms a continuous passageway along the air distribution ceiling's length. This room construction creates a pressure differential at strategic locations in the room so that air is distributed uniformly throughout the boxes in the room. As a result, the greatly non-uniform air flow of conventional ripening rooms is replaced by a substantially uniform air flow density for all the banana boxes regardless of their position on pallets within the ripening room.

Further, the present invention uses less forced-cooled air throughout the ripening period than conventional systems that completely switch on the refrigeration system at times of heavy demand. Rather, the present invention provides a very precise temperature controller that slowly and gradually decreases the setpoint temperature over the entire ripening cycle. Consequently, the air fans and the cooling system operate at a higher efficiency. In the preferred embodiment, related hereinbelow, the present invention requires only three large fans instead of the higher number of fans necessitated by conventional designs.

In another aspect of the present invention, a highly efficient "cooling transformer" is provided in which two air circuits are formed within the ripening room. A small quantity of air in a "smaller" air circuit is significantly cooled by the cooling system, rather than having all of the air only cooled slightly, as in conventional designs. The cooling transformer's dual air circuit system effectively and efficiently transfers heat between the smaller air circuit (that passes through the air cooler), and a much "larger" (in volume) air circuit that circulates through the fruit. The two air circuits come into contact with one another at only a single area which acts as a mixing chamber or "cooling transformer," where the air from both circuits are mixed together. The construction is very simple and the cooler/evaporator system can work in a wider temperature range at a greater efficiency as compared to conventional ripening rooms. Since it never touches the bananas, the air temperature of the coolest air in the smaller air circuit can remain much lower than the air temperature in the larger air circuit.

Still other aspects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1A:
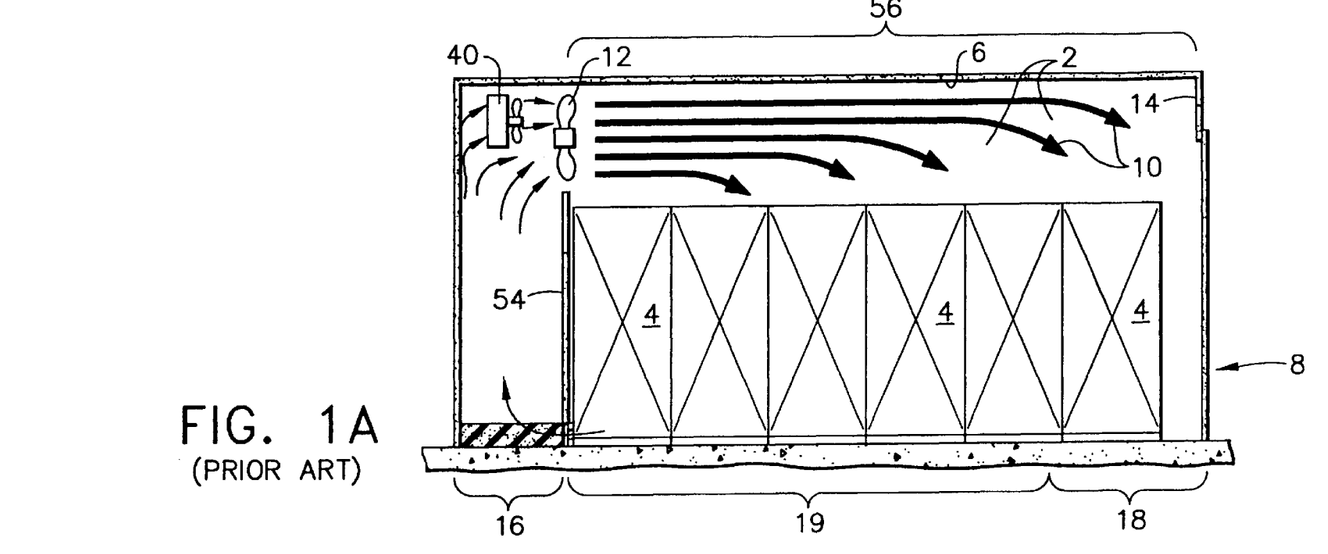
FIG. 1A is a diagrammatic elevational side view of a prior art ripening room construction.

FIG. 1A shows the cross-sectional side view of the air flow distribution scheme of a conventional ripening room construction, well known in the prior art and generally referred to as the "Del Monte" design. A large, open space 2 separates tightly stacked banana boxes 4 from the ceiling 6 of the ripening room 8. The air flow 10 induced by fans 12 is not equally distributed through all of the boxes 4 because the majority of the air moves in a horizontal direction from the rear fans 12 and typically does not tend to flow vertically downward through the boxes 4 below, but rather continues flowing horizontally along the path of least resistance, until encountering back pressure from the vertical surface of front wall 14. Consequently, the majority of the air flow 10 being forced from the fans 12 located in the rear area 16 bypasses the rear-most boxes of bananas and is forced downwardly into the boxes 4 primarily in the front areas of the room at locations generally designated by index numeral 18. This configuration results in greener bananas located in the front areas 18 of the room because of the greater quantity of cooled air, and riper, more yellow bananas in the remaining areas 19 of the room, where there is much less cooling air circulating through the boxes 4. A cooling system 40 is provided near the rear of room 8, and a wall 54 divides room 8 into two major portions, (1) an operational area 56 and (2) a cooling area 16.

Figure 1B:
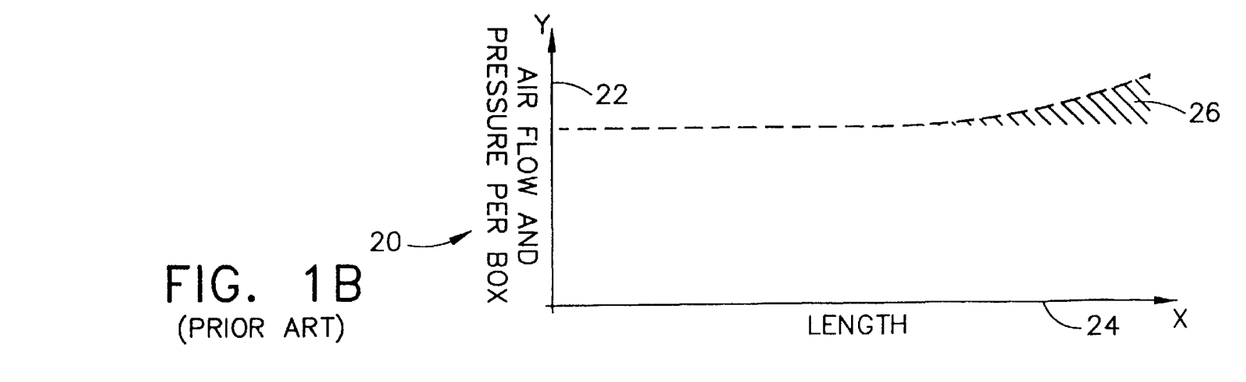
FIG. 1B is a graph of the air flow characteristics of the prior art ripening room of FIG. 1A.

FIG. 1B shows an X-Y graph 20 of the air flow and pressure per box (along the Y-axis 22) as a function of the distance (along the X-axis 24) along the length of the room 8. As the graph 20 indicates, there is greater air flow and pressure 26 in the front portions of the room at 18 causing those bananas located in this front portion 18 of the room to ripen more slowly because they receive greater cooling.

Because the temperature of the air affects the temperature of the bananas, and the temperature of the bananas effects the ripening process, it is critical that all of the bananas in a ripening room receive a uniform quantity of cooling air flow in order to effect even ripening throughout. However, there is nothing in the conventional ripening room construction to help distribute the air uniformly to achieve such even ripening of the bananas throughout the room 8.

Figure 2A:
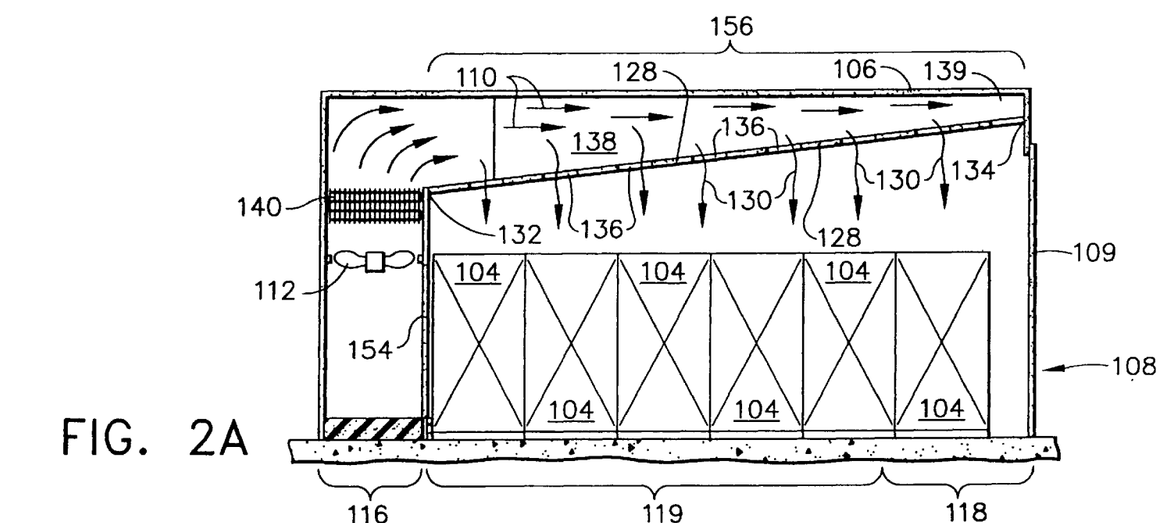
FIG. 2A is a diagrammatic elevational side view of a ripening room embodiment constructed according to the principles of the present invention.

FIG. 2A shows in a partially schematic format a cross-sectional side view of one embodiment for an air flow distribution scheme and ripening room construction according to the principles of the present invention. An air distribution ceiling 128 is provided in order to achieve a uniform air flow 130 for all of the boxes of perishable products (e.g., bananas) 104 irrespective of their positions within the ripening room, generally designated by the index numeral 108. The preferred air distribution ceiling 128 is slanted, such that its rear end 132 is lower in elevation than its front end 134. Air distribution ceiling 128 also has distinct holes 136 acting as air passageways located along the length of its sides (as better viewed in FIG. 3). The holes 136 preferably become progressively smaller from the rear 132 to the front 134 of ceiling 128, in order to encourage air flow to the rear-most fruit boxes 104 located in areas depicted by the index numeral 119, and to discourage air flow to the front-most fruit boxes 104 located in areas depicted by the index numeral 118. The front of ripening room 108 preferably includes a door 109 that allows easy access into the room.

Figure 4:
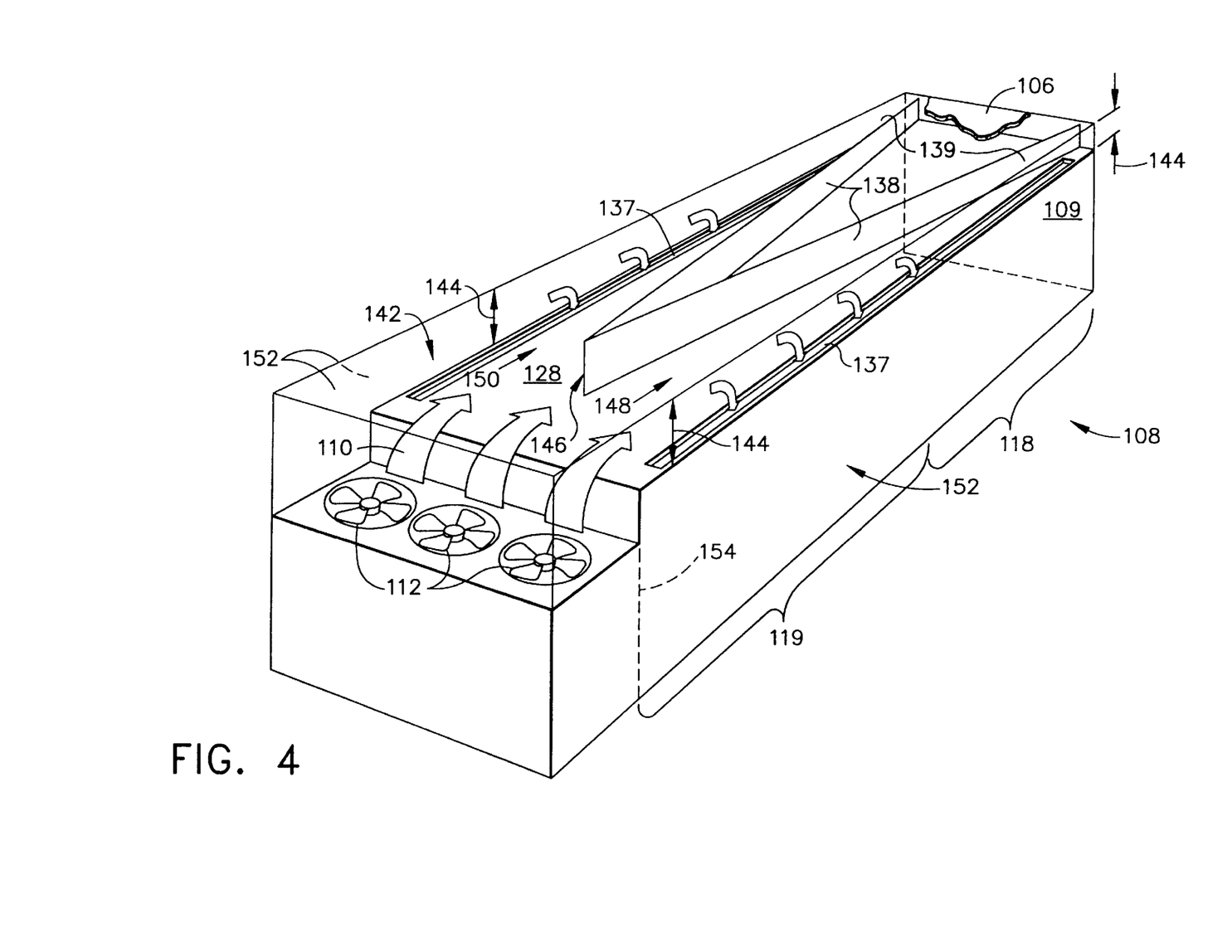
FIG. 4 is a similar perspective view of an alternative embodiment of a ripening room very similar to that depicted in FIG. 3.

In an alternative embodiment, the air distribution holes can be replaced by a single elongated slot 137 along each side of the ripening room ceiling, as shown in FIG. 4. Any number of variations in size and spacing of the air distribution holes is possible, all of which fall within the scope of this invention. For example, the longitudinal side edges of slots 137 could be in a non-parallel relationship to one another and could taper down at one end.

Figure 3:
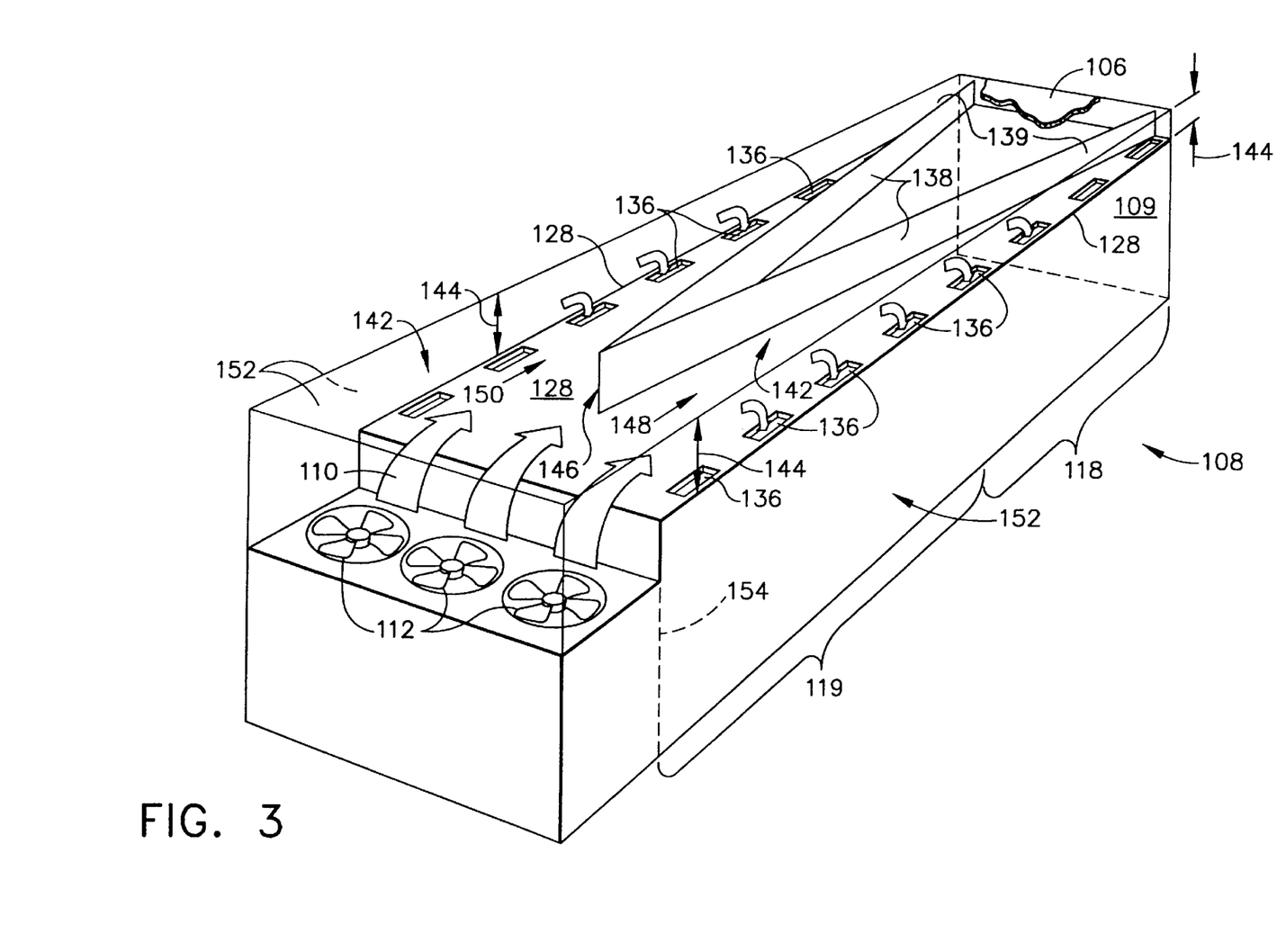
FIG. 3 is a perspective view from the top and rear of the ripening room depicted in FIG. 2A.

In addition to the upward slant and progressively smaller holes 136 in the air distribution ceiling 128, a "V"-shaped air distributor 138, as best viewed in FIG. 3, is provided between the air distribution ceiling 128 and the overall ceiling 106 of ripening room 108. The air distributor 138 directs the air flow into two paths and is configured to specifically increase the back pressure in the spaces near the front portion of the room (at index numeral 139), thereby decreasing the air flow volume at the front of the room. The result is that the path of least resistance for the forced air 110 expelled by fans 112 through air cooler 140 (not shown in FIG. 3 and 4) is no longer all the way to the front portion 118 of ripening room 108.

When properly constructed, ripening room 108 will have no particular air flow path of least resistance; instead, there will be achieved a uniform flow of air through all fruit boxes 104. These three improvements related above—the ceiling 128, the distribution holes 136 or 137, and the "V"-shaped air distributor 138—taken alone or together, achieve a more uniform air distribution through the fruit boxes 104. Uniform air distribution provides minimal differences in air flow through the various parts of the ripening room, thereby ensuring relative temperature uniformity among the pallets and boxes of bananas.

Figure 2B:
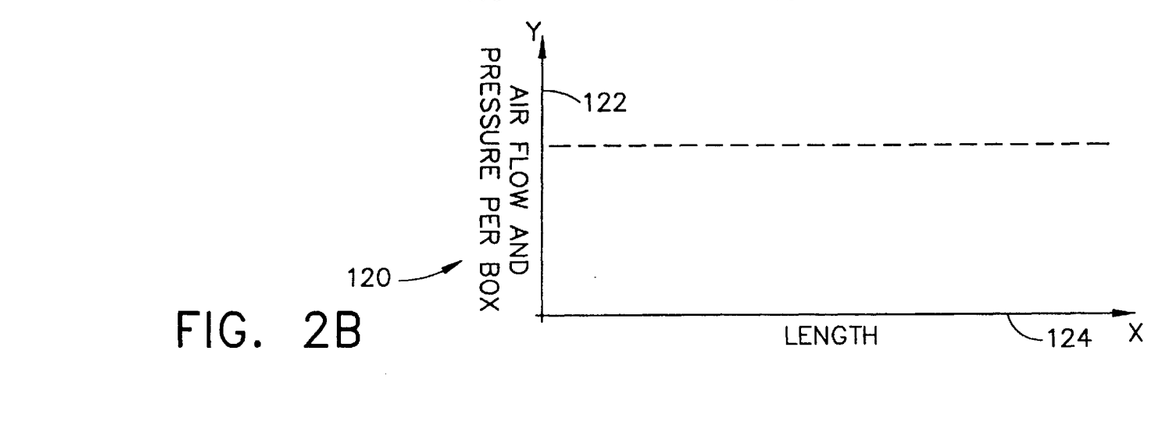
FIG. 2B is a graph showing the air flow characteristics of the ripening room of FIG. 2A.

FIG. 2B is an X-Y graphical representation 120 of the air flow and pressure per box (along the Y-axis 122) as a function of distance (along the X-axis 124) over the length of the ripening room 108 of the present invention. This graph shows that the air flow and pressure per box 122 (which is proportional to cooling intensity) is substantially uniform as a function of the distance 124.

FIG. 3 shows the top perspective view of the "V"-shaped air distributor 138, which is provided in the space 142 between the air distribution ceiling 128 and the ripening room ceiling 106. It will be understood that air distributor 138 is not required to have a precise "V" shape in order to fall within the scope of the present invention. For example, air distributor 138 may be somewhat "U"-shaped or may be curved or angled at various points in order to more precisely control the air flow pathways into the air distribution holes 136 or slots 137 or for other reasons, as desired. In the illustrated embodiment, however, the described air distributor 138 preferably is "V"-shaped.

The height of the "V"-shaped air distributor 138 is substantially equal to the varying vertical distance 144 between the air distribution ceiling 128 and the ripening room ceiling 106. The "V" shape is most clearly perceived in a cross-sectional top view of the ripening room of the present invention. The point of the "V" shape is located at the index numeral 146, toward the rear of the room 106. The "V" shape forms two air circulation paths 148 and 150 for the cooling air 110 blowing from the fans 112 to follow, one path along each side wall 152 of room 108. The cross-sectional area of the space 142 (above the air distribution ceiling) available to accept air flow 110 expelled from the fans 112 becomes smaller while approaching the front portion of the room 108 (in area 118) because both the height and the width of each of paths 148 and 150 above the air distribution ceiling 128 preferably decrease toward the front of the room 108, due to the slanted configuration of the air distribution ceiling 128 and the "V"-shaped air distributor 138, respectively. While approaching the front of the room 108, the combination of the decreasing volume above the air distribution ceiling 128 and the progressively smaller holes 136 or elongated slots 137 in the distribution ceiling 128 causes the air pressure to the boxes throughout the room to be substantially uniform. As a result, the bananas are cooled and ripened substantially uniformly.

FIG. 4 illustrates the elongated slots 137, in lieu of the individual air distribution holes 136, along each side of air distribution ceiling 128. Each slot preferably is 18–20 centimeters wide, and substantially follows the length of the room. Slots 137 may have either a constant or variable width, as desired, to achieve a substantially uniform air flow through all fruit boxes in the operational area 156.

Figures 5, 6:
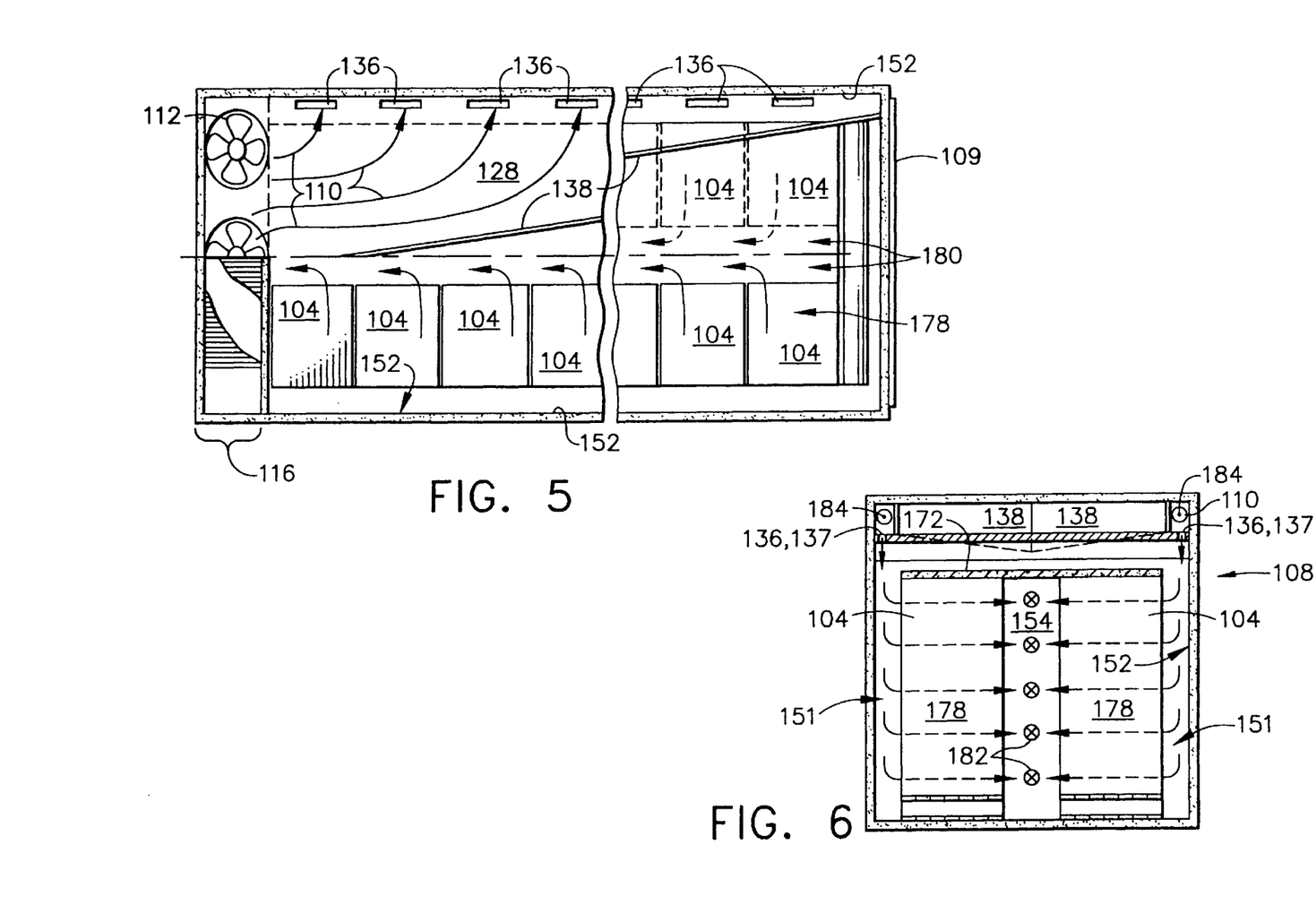
FIG. 5 is a top plan view in partial cross-section of the ripening room depicted in FIG. 2A.
FIG. 6 is a front elevational view in partial cross-section of the ripening room depicted in FIG. 2A.

FIG. 5 is a top cut-away view of ripening room 108 as seen from above the room 108, illustrating the air flow pathways. The top half of the drawing illustrates the view from above air distribution ceiling 128. The bottom half of the drawing illustrates the view from below air distribution ceiling 128. The force of the fans 112 in the back of the room (i.e., from the "cooling" area 116) circulates air throughout the room 108. When arranged in a tight stack, the stacks of boxes 104 are generally configured into two rows 178 of boxes on pallets that are spaced-apart from the side walls 152 and separated by a corridor 180. The air flow 110 from the fans 112 is directed by the air distribution ceiling 128 and air distributor 138 into air distribution holes 136 (or, optionally, slots 137) along the side walls 152. The air is then drawn through holes in the boxes 104 into the corridor 180, to the rear of the room 116, then through the air cooler 140 (not shown in FIG. 5) to the fans 112.

FIG. 6 is a cut-away view from the front end of the room toward the rear of the room, as if the door 109 and upper front wall were cut-away. This view also illustrates the air flow pathways where encircled x's as in index numerals 182 indicate flow into the page and encircled dots 184 indicate flow out of the page. As can be discerned in FIG. 6, the air flow 110 from fans 112 is directed downward through the holes 136 or slot 137 in the air distribution ceiling 128. This air flow continues downward within the spaces 151 along side walls 152 until flowing through the stacked banana boxes 178. A tarp 172 preferably is used to cover the top areas of the stacked boxes of fruit. The air flow continues into the center corridor 108, where it returns to the cooling area 116, via a screen or opening in wall 154.

Figure 7:
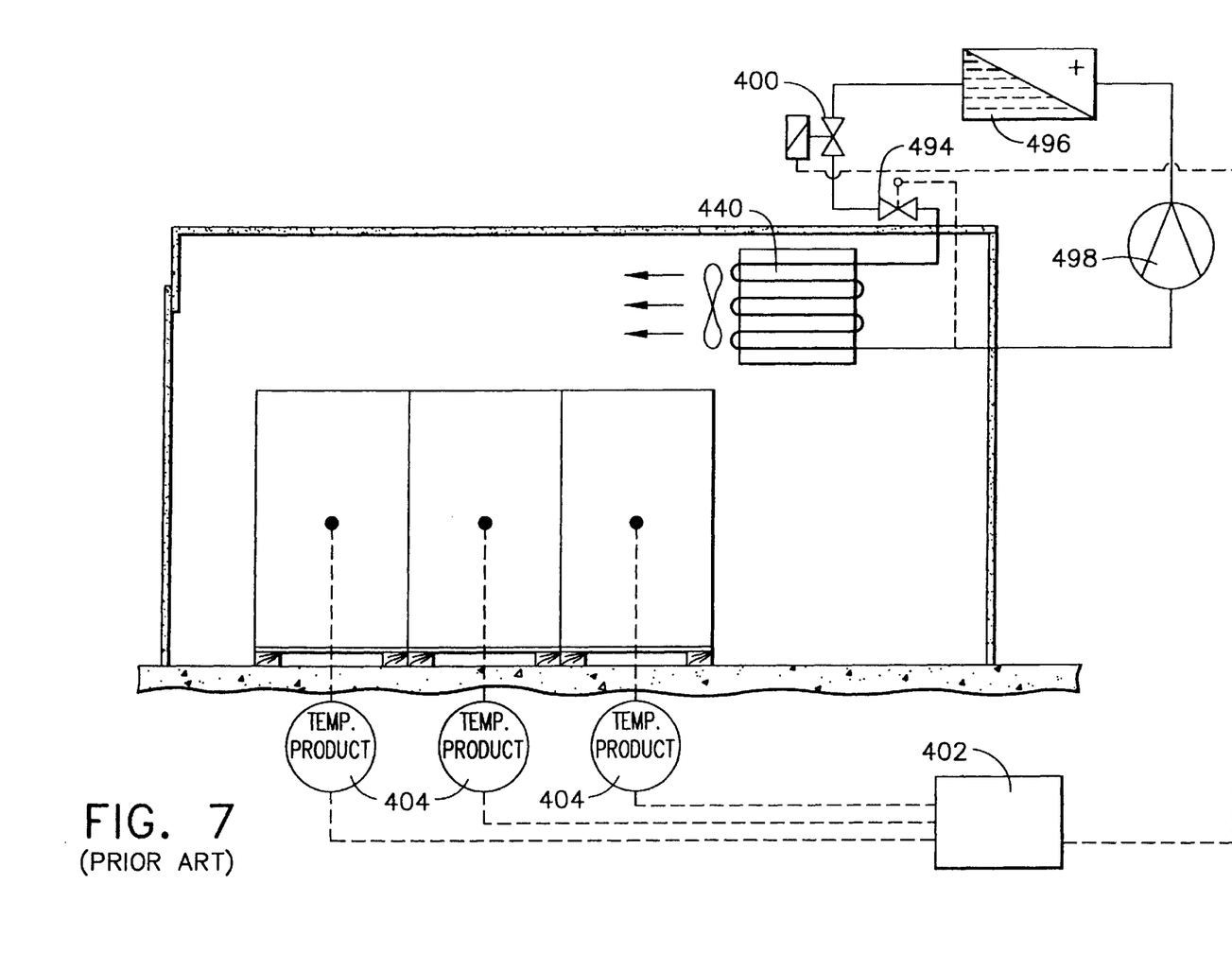
FIG. 7 is a schematic diagram of a prior art cooling system used in conventional banana ripening rooms.

FIG. 7 shows a schematic of a typical prior art cooling system used in conjunction with banana ripening rooms. Such a conventional cooling system for ripening rooms would include an air cooler/evaporator 440, cooling compressor 498, condenser 496, solenoid valve 400, thermostatic expansion valve 494, product temperature sensors 404, and a thermostat or thermostatic programmer 402.

In such prior art cooling systems, changes in fruit temperature during the ripening cycle are made by varying the air temperature setpoint in large, sudden steps over time, as controlled by thermostatic programmer 402. The product temperature is measured by temperature sensors 404 which transmit electrical signals as inputs to the thermostatic programmer 402. The product temperature is compared to the setpoint temperature and, when appropriate, the thermostatic programmer transmits an electrical output signal to solenoid 400 to turn the cooler on or off. The cooler is actuated by switching on solenoid valve 400 which allows the coolant to be supplied to evaporator 440. Optionally, the minimum air temperature could be limited by a safety thermostat.

When the prior art thermostatic programmer suddenly changes the setpoint temperature according to its program, from 18.5° C. to 16.5° C. for example, the refrigeration or cooling system works at full capacity for periods of long intensive cooling, thereby inducing considerable dehydration and lowering of fruit ripening quality. This is particularly true in configurations where temperature sensors 404 are placed in the boxes among banana clusters at the air outlet side so that the time delay in the feedback loop is increased.

Generally, the evaporation temperature of the coolant varies due to changes in cooling requirements during the ripening process and changes in ambient temperature conditions in the enclosed space. However, conventional systems as shown in FIG. 7 are designed to operate based on a constant evaporation temperature that is controlled by a back pressure regulation valve, which results in fruit dehydration and low relative air humidity.

The function of thermostatic valve 494 is to control the flow of liquid refrigerant being fed to evaporator 440 in response to the superheat of the coolant vapor leaving it. Its basic function is to keep the rate of flow into evaporator 440 as high as possible without permitting liquid coolant to be returned to the compressor. This is usually done by controlling the mass flow of coolant entering the evaporator 440 so that it equals the rate at which it can be completely vaporized and superheated to a given amount by absorption of heat from the cooled media. This control loop, sometimes referred to as liquid feed regulation, represents a system with varying (often considerable) time lags. The problem associated with controlling a thermostatic valve is improved by use of an electronically-controlled proportional expansion valve such as valve 394 on FIG. 8, along with a pressure-regulating modulating or suction valve 300 as used in the present invention, which is described more fully hereinbelow. Thermostatic expansion valves are self-acting proportional-controllers in a very crude sense. Their load-dependent deviation from the originally set superheat is inherent, and the lower the suction pressure, the higher this deviation becomes. The deviation in superheat is also influenced by the number of compressor stages in operation and by the condensing pressure. These deviations can degrade the system capacity noticeably. Consequently, thermostatic expansion valves do not provide optimum performance in ripening room applications. Hence, an electronic proportional expansion valve system is adapted in the present invention to better control the loop.

Figure 8:
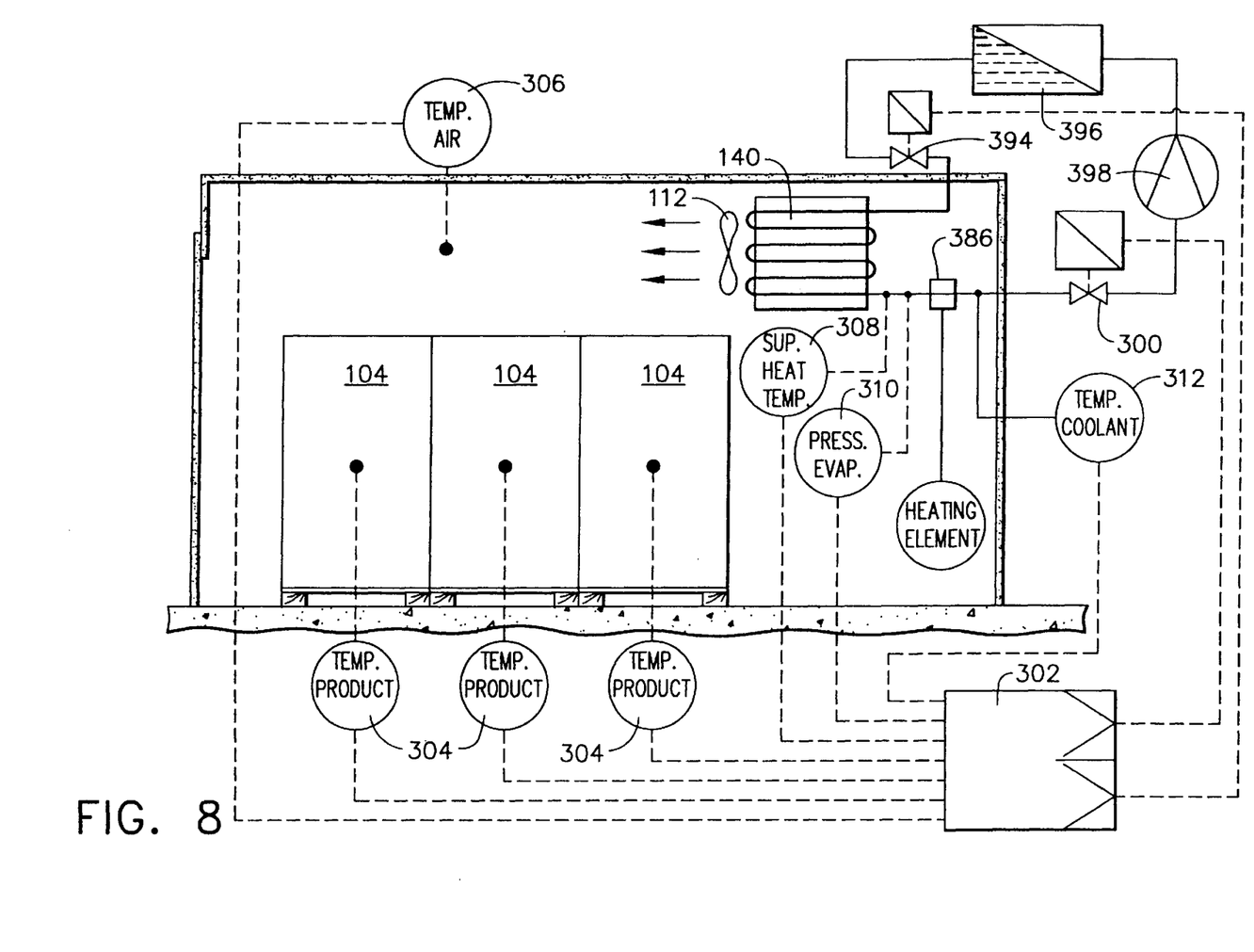
FIG. 8 is schematic diagram of an embodiment of a cooling system used in the ripening room of the present invention as depicted in FIG. 2A.

FIG. 8 illustrates the major components of an improved cooling or refrigeration system used in the present invention having a logic control unit 302, temperature and pressure sensors 308, 310, and 312, electronic expansion valve 394, modulating valve 300, and heating element 386. The system is specifically designed for ripening room applications to control the temperature of air introduced into the operational area of a ripening room, by gradually changing the setpoint temperature over time, based on input signals relating to the product (e.g., bananas) temperature, air temperature, coolant superheat temperature, and coolant evaporation pressure during the ripening cycle. The cooling or refrigeration system is constantly operating somewhere in the range of, for example, 10–100%, rather than having only two possible operating states, i.e., either full ON or full OFF.

The FIG. 8 illustrates the major components as follows: fans 112, air cooler/evaporator 140, coolant superheat temperature sensor 308 (which regulates the expansion valve 394), coolant evaporation pressure sensor 310, heating element 386, coolant temperature sensor 312, modulating or suction valve 300 (which is preferably a proportional valve controlled by special electronics), cooling compressor 398, condenser 396, electronic expansion valve 394, boxes of products 104 being cooled, air temperature sensor(s) 306, product temperature sensors 304, and logic control unit 302 having several Proportional-Integral-Differential (PID) controllers.

Fans 112 blow air into the operational space of the ripening room through boxes 104 where the product temperature is measured at multiple points in or near the banana boxes 104. Logic control unit 302 receives and analyzes input signals from the product temperature sensors 304, the air temperature sensor 306, the coolant superheat temperature sensor 308, the evaporation pressure sensor 310, and the coolant temperature sensor 312. The control system measures the input data, compares the product temperature to the setpoint temperature and adjusts its outputs accordingly. Logic unit 302 provides output signals to the modulating valve 300 interface, as well as the electronic expansion valve 394 interface. Specifically, sensor 308 measures the superheat of coolant 388 exiting the evaporator, and this information is used to adjust the expansion valve 394; sensor 310 measures the evaporation pressure, and this information is used to adjust modulating valve 300, which changes the coolant pressure. By gradually changing the evaporation pressure with modulating valve 300, the evaporation temperature is smoothly controlled in the range of approximately 5° C. and 15° C. in order to balance the system.

Once the coolant gains heat after passing through evaporator 140, its superheat temperature is measured and processed to adjust expansion valve 394, and its evaporation pressure is measured and processed to control modulating valve 300. Coolant 388 preferably is then warmed a slight amount by heating element 386 in order to raise the relative air humidity, as is more fully described below with respect to FIG. 10. After warmed by heating element 386, the coolant temperature is measured by temperature sensor 312 which is used to adjust heating element 386 in order to maintain a substantially constant temperature difference in the coolant at the points just before and after the heating element 386, i.e., at 308 and 312. The temperature difference across the heating element 386 should remain substantially constant. In response to the measured temperature difference, a special controller will control the voltage output (heating capacity output) to the heating element. As in conventional cooling systems, coolant 388 then passes through compressor 398 where its temperature and pressure are both increased in the gas phase, and condenser 396 where the gas is condensed into a liquid, prior to reaching expansion valve 394. It will be understood that, in an actual cooling installation, additional components may be found other than those illustrated on FIG. 8 without departing from the principles of the present invention.

Expansion valve 394 provides improved liquid feed regulating control, which allows for smooth changes in cooling air temperature over time in response to the changing setpoint temperature and coolant properties, in order to provide the highest possible humidity in the ripening room and to reduce the required cooling capacity. By using a proportional expansion valve, as opposed to a thermostatic expansion valve, the evaporator 140 is configured to contain more liquid and thus is more efficient. This provides a better loading of evaporator 140, which results in better overall efficiency because the energy gained by the improved cooling system is greater than the energy lost by raising the temperature of coolant 388. The higher efficiency is also due in part to the elimination of excess lag time and rise time normally associated with stepwise temperature controls.

Figure 9:
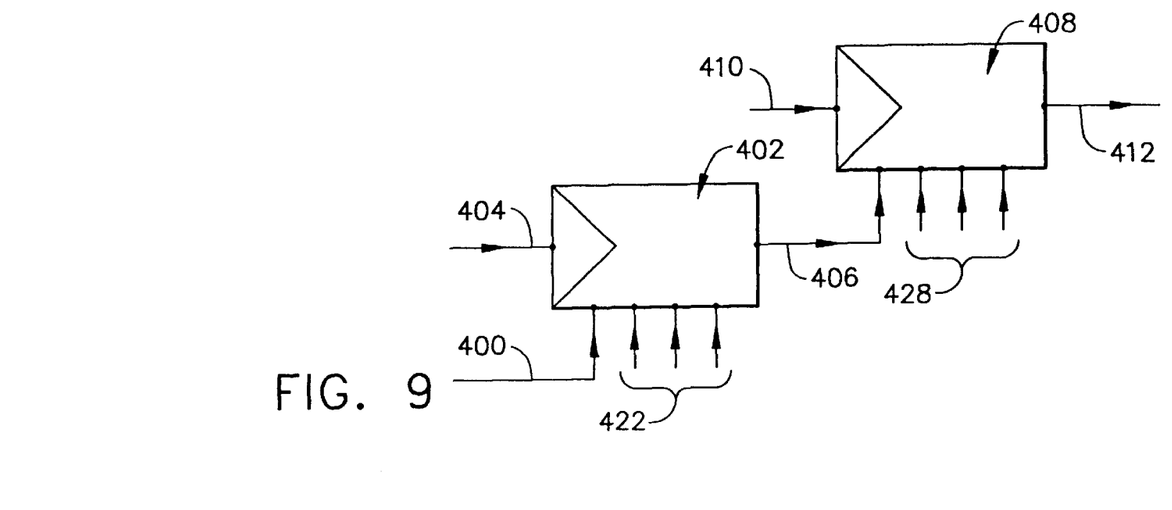
FIG. 9 is a logic diagram of the control system used to control the positioning of the suction valve of FIG. 8.
Figure 11:
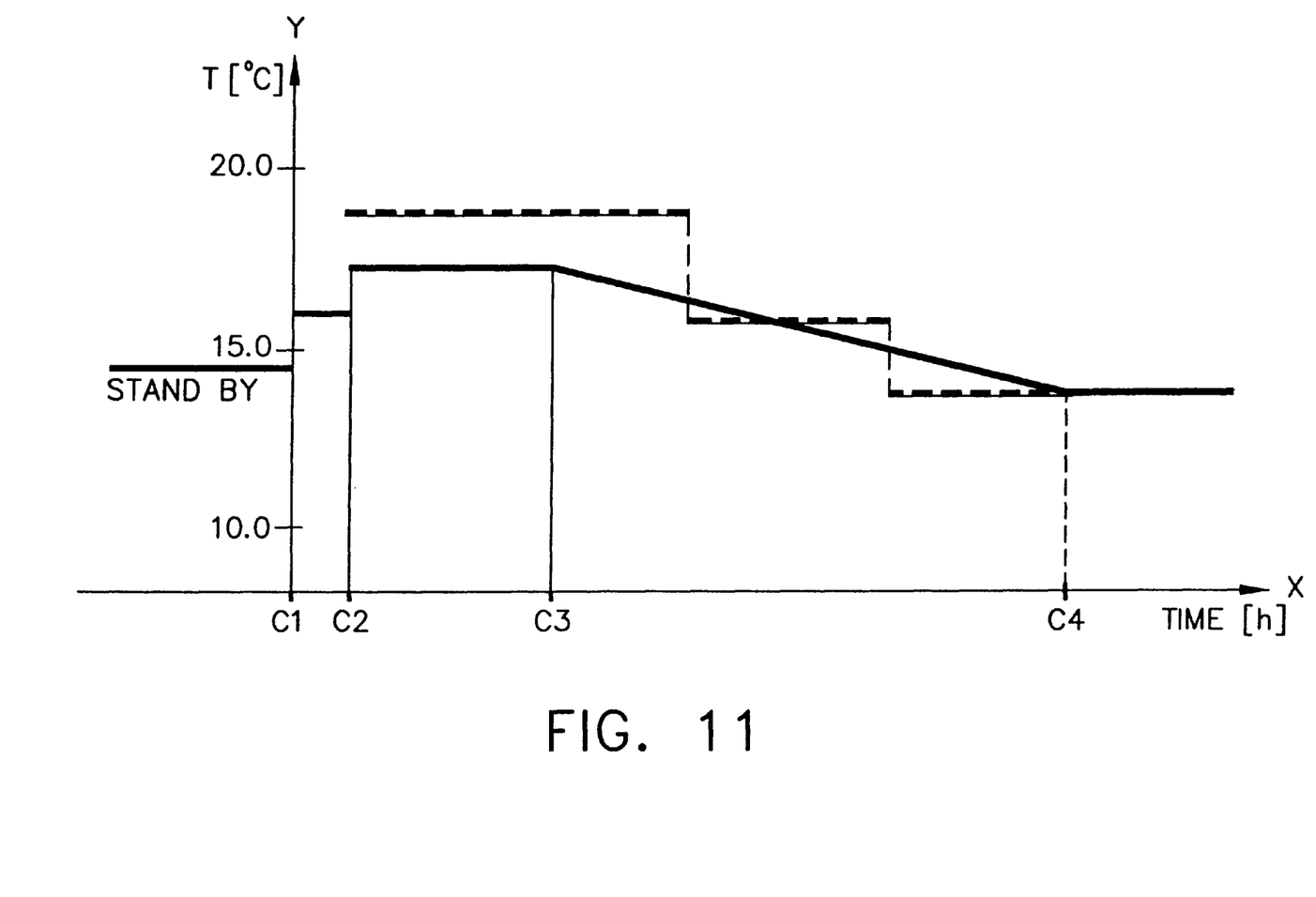
FIG. 11 is a graph comparing the setpoints used by the present invention and a typical prior art cooling system, both used in ripening cycles for bananas or other perishable products.

FIG. 9 represents a control logic diagram that generally describes a preferred method for controlling and modulating the proportional suction valve 300 (as seen on FIG. 8). The perishable product setpoint for any of the ripening room embodiments described herein preferably is controlled so as to be relatively constant during a "gassing" step, during which ethylene gas typically is introduced to begin ripening of the perishable fruit products (such as bananas). Once that period has ended, it is preferred to gradually cool the perishable fruit products with the ripening room while the fruit becomes adequately ripened either to be placed in further storage or for shipment to a distribution center. As can be seen in FIG. 11, related in detail hereinbelow, it is preferred to very gradually decrease the setpoint temperature over long periods of time, and this setpoint temperature preferably will be adjustable (i.e., as an internal computer numeric variable) to a very high precision, for example, to the nearest one-hundredth or one-thousandth of a degree Celsius.

As will be understood by those of ordinary skill in the art, a microprocessor or other type of control circuit can be used to program the gradual decrease of the setpoint over many hours, or even days, of time such that the setpoint may fall by only three or four degrees Celsius over a three or four-day time span. In the illustrated embodiment, a 16-bit microprocessor is used as the central intelligence of logic unit 302, and therefore, a precision to the nearest one-hundredth degree Celsius is possible. Of course, the displayed temperature typically need not be more accurate than one-tenth degree Celsius. The main product temperature setpoint is introduced at the index numeral 400 on FIG. 9 as an analog input to a first PID (proportional-integral-differential) controller, designated by the index numeral 402. Setpoint 400 is the "calculated" setpoint temperature for the fruit products (e.g., bananas) which varies according to the setpoint control program, as related above. Another analog input is provided to PID controller 402, and this other input represents the actual fruit product temperature, as indicated at the index numeral 404. The output of PID controller 402 is a numerical value or analog voltage signal indicated by the index numeral 406.

Signal 406 is provided as an analog input (or as a numeric variable) to a second PID controller, designated by the index numeral 408. A second analog input is also provided to PID controller 408, and this represents the current temperature of the supply air (e.g., supply air 110 on FIG. 2A, or supply air 210 on FIG. 12), as designated by the index numeral 410. The output of PID controller 408 is a signal designated by the index numeral 412, and preferably is an analog electrical signal used to position the suction valve 300 on the schematic diagram of FIG. 8.

As can be seen in FIG. 9, the two PID controllers 402 and 408 are "cascaded," whereby the output from controller 402 is used directly as an input to controller 408. Other inputs to these PID controllers (i.e., signals 422 and 428) represent the "controller action parameters" which typically are provided to determine the operational characteristics of a PID controller, more specifically to set the values for the gain, integration constant, and differentiation constant for PID controllers. In the case of PID controller 402, these inputs are represented logically by the arrows 422, and these similar inputs are represented by the arrows 428 for PID controller 408.

In a preferred embodiment, the control action parameters 422 for PID controller 402 are as follows: the gain is set for a 40° K. control range, the integration time is set in the range between ten and twenty minutes, and the derivative constant is set to zero (i.e., there is no derivative characteristic to PID controller 402).

The preferred control action parameters 428 for PID controller 408 are as follows: the gain is set to a control range of 20° K., the integration time is set to five minutes, and the derivative constant is set to zero. It will be understood that other control action parameter values for both PID controllers on FIG. 9 can be used without departing from the principles of the present invention.

Although gain control ranges and integration times other than listed above may be used for either or both of the PID controllers 402 and 408, under the cascade control principle it is important that the operating speed characteristics of PID controller 408 be faster than the upstream control block represented by PID controller 402.

As briefly described above, a heating element 386, as shown in FIG. 10, is preferably provided at the outlet of evaporator 140 in order to improve overall efficiency in the cooling system. As in conventional evaporators, coolant 388 passes through at least one coolant tube 390 (also called a refrigerant line) of evaporator 140, and is affected by the incoming warmer air temperature, thereby changing from a liquid state to a vapor within coolant tubes 390. As an example, the inlet air temperature "T3" into evaporator 140 might be 12° C. and the outlet air temperature "T4" might be 8° C., as the coolant in the evaporator heats and changes from a liquid to a vapor. However, it has been demonstrated that by warming the outgoing coolant vapor further, for example, from 4° C. at "T1" to 7° C., at "T2" on FIG. 10, the humidity of the room can be raised, resulting in shinier, better-looking (and therefore, more marketable) bananas.

Figure 10:
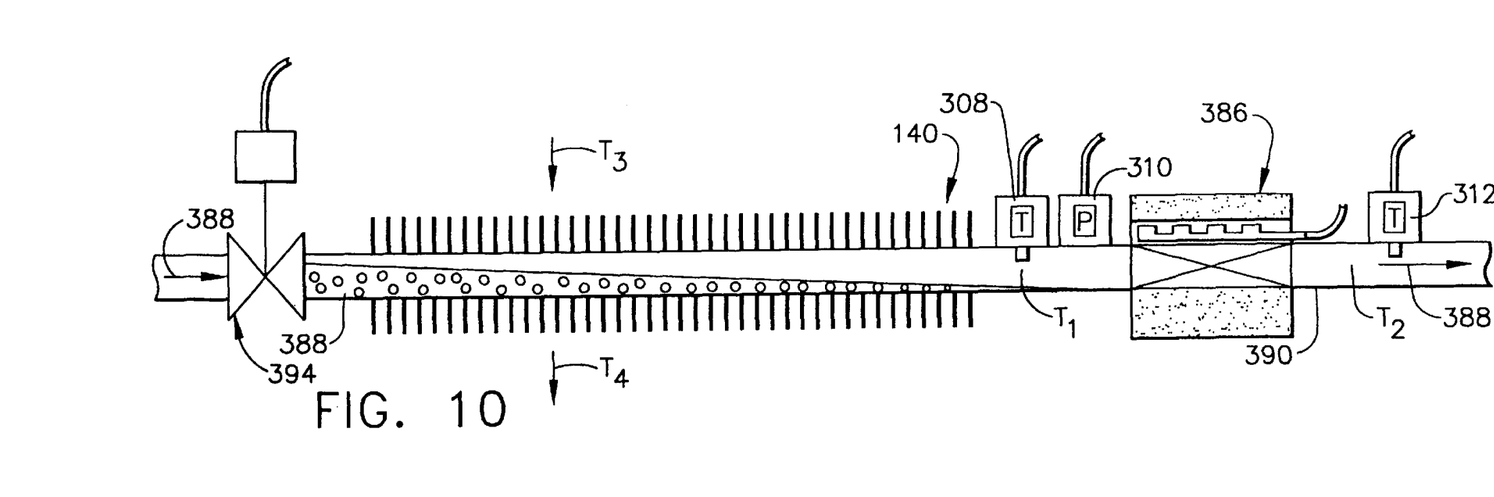
FIG. 10 is a diagrammatic view of a portion of the schematic diagram of FIG. 8.

Heating element 386 is, therefore, provided to further warm the coolant vapor 388 in coolant tube 390 after it leaves evaporator 140. Adding heating element 386 to the system will raise the relative humidity in the banana ripening room to, for example, 93 percent (93%), where it otherwise would be at only about 88 percent (88%) without heating element 386. As the difference between the evaporation temperature and the air temperature decreases and the evaporation temperature approaches the product temperature, the air humidity increases. It should be noted that while these example temperatures provided herein are accurate for some banana ripening uses, they are given by way of example only and may vary depending upon the application without departing from the principles of the present invention.

FIG. 11 is a graphical illustration of the smooth, gradual setpoint temperature ripening program used throughout the preferred ripening cycle when using the temperature control system of the present invention, as compared to the stepwise temperature setpoint changes found in conventional ripening cycles. The Y-axis represents temperature in ° C., the X-axis represents time, the solid line graph represents the setpoint used by the present invention, and the dashed line graph represents the setpoint used by conventional ripening rooms. In both systems, the perishable product setpoint temperature is controlled by a temperature controller or an automatic thermostat. The time interval between the designators C1 and C2 represents a temperature equalizing period. The time interval between designators C2 and C3 represents a period of gassing, and the interval between C3 and C4 represents the cooling period. C4 represents the starting time for storage of the ripened fruit product.

During the period of gassing from C2 to C3, ethylene gas, for example, is introduced into and circulated throughout the room. Both the conventional and the present invention's setpoint temperature control systems would typically keep the input setpoint temperature constant. During the period of cooling from C3 to C4, in which air is circulated throughout the room or container, the setpoint temperature of the supplied cooling air is decreased gradually over time by logic control unit 302 in the present invention. In conventional ripening rooms, however, the setpoint temperature is decreased stepwise, as can easily be seen at the vertical dashed lines between C3 and C4. This sudden setpoint variation causes the prior art cooling system to turn on for full cooling, and the actual fruit temperature likely will undershoot the new setpoint. Furthermore, this condition will cause dehydration and undercooling of the fruit, particularly where temperature sensors are placed in the boxes among banana clusters at the air outlet side so that the time delay in the feedback loop—which adjusts the input setpoint temperature—is increased.

During that same period of time between C3 and C4, the ethylene gas may be removed, followed by a relatively long period where air is circulated by the fan(s) while the setpoint temperature of the supplied air is lowered. As shown in FIG. 11, the temperature drop gradually continues in the ripening cycle of the present invention, but drops in large discrete steps in conventional ripening cycles. The bananas typically are stored at a chosen constant temperature during the period of time after C4.

Figures 12, 13, 14:
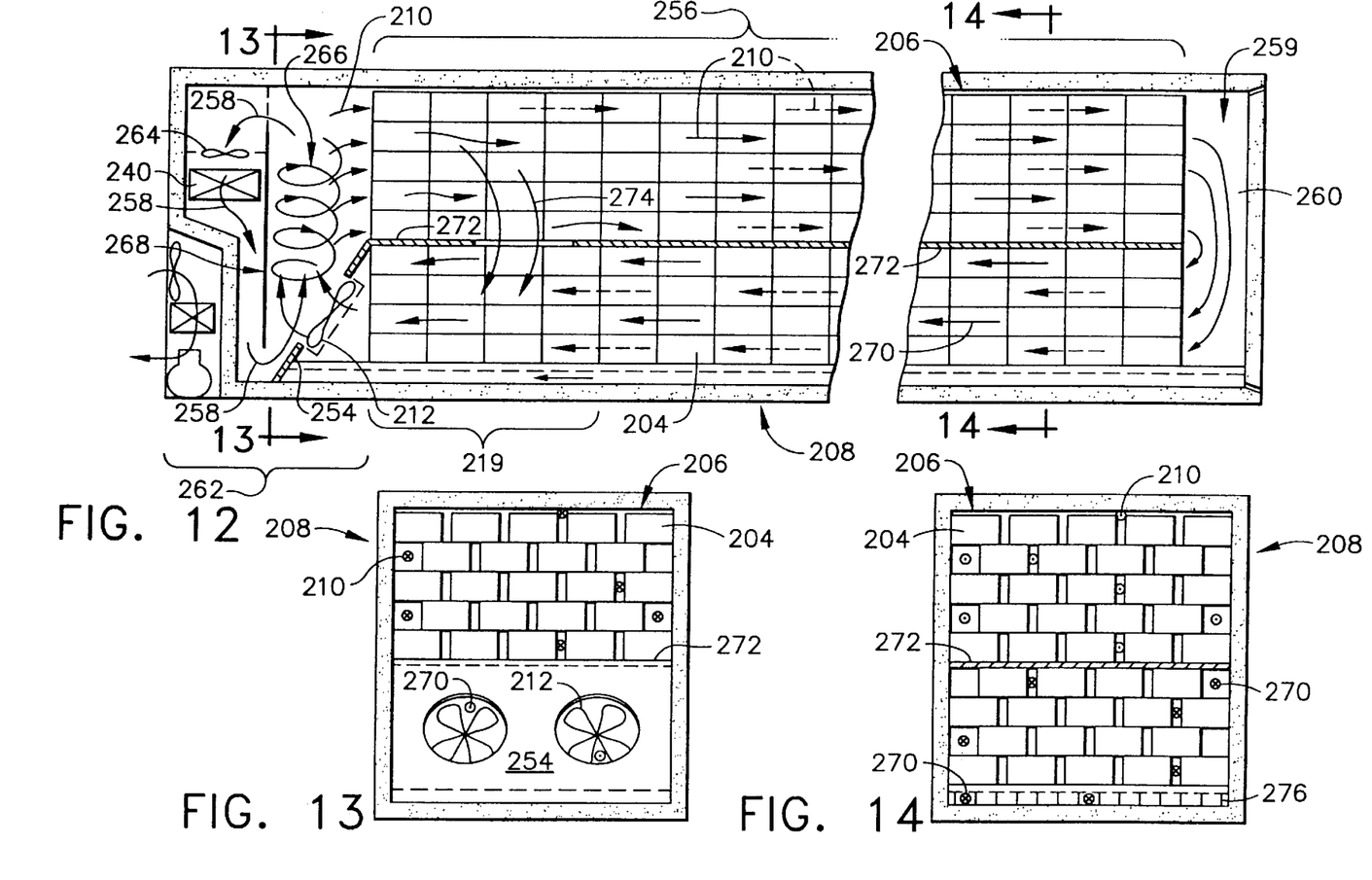
FIG. 12 is a side elevational view in partial cross-section of a ripening container that includes a cooling transformer, as constructed according to the principles of the present invention.
FIG. 13 is a cross-section view of the ripening container of FIG. 12, taken along the line 13—13.
FIG. 14 is a cross-sectional view of the ripening container of FIG. 12 taken along the line 14—14.

Referring back to FIG. 1, the air in conventional banana ripening rooms and containers circulates in a single path, from between the boxes 4, through an opening in the wall 54, through the cooler 40, back out into the operational space 56 and then drawn through the boxes 4 again, to form a complete circuit. In contrast, the present invention provides an improved cooling system (as illustrated in FIG. 12), which includes a banana ripening room or container having two separate air circuits, in which their initial branches of the air circuits are depicted as index numerals 258 and 210. This improved cooling system provides superior energy efficiency and can be used with or without an air distribution ceiling 128 or air distributor 138 as shown in FIG. 2. Further, this cooling system can be used with a two-row tight-stack box configuration as related above, a pyramid stacking configuration, or any other suitable stacking configuration. For the purposes of this description, the improved cooling system will be described as used in a container-type ripening room with pyramid-stacked boxes. It will be understood that a typical container 208 will comprise a trailer up to 40 feet in length, for example, and which is transportable over roads, usually being pulled by a truck engine.

In FIG. 12, a "cooling transformer" 262 is depicted which transfers heat quite effectively between a smaller air circuit 258 that passes through an air cooler 240, and a much larger (in volume) air circuit 260 that cools the fruit stored in boxes 204. The path of the larger circuit 260 (the so-called forced-air circuit) does not pass through the air cooler 240. Of the total air flowing within container 208, air circuit 260 may have seventy to eighty percent (70%–80%) of the total system air flow whereas the smaller air circuit 258 may only have twenty to thirty percent (20%–30%) of the total system air flow, for example. The flow rate through the bananas may be as high as about 10,000 m$^3$/hr, and the air flow through the smaller circuit could, accordingly, be approximately 2,500 m$^3$/hr, for example. The two air circuits 258 and 260 meet only in a single area, in a mixing chamber 266 where the air from both circuits are mixed together. The mixing chamber 266 is bounded by a "supplemental" wall 254 on one side and a partial wall 268 on its other side.

Since the smaller air circuit contains cooled air, the larger air circuit 260 transfers heat to the smaller air circuit 258, thereby lowering the larger air circuit's temperature, and transferring the cooling energy of the smaller air circuit 258 to the cooled product in boxes 204. For example, a temperature decrease of 4° C. in the smaller air circuit 258 could cause a temperature decrease of approximately 1° C. in the larger air circuit 260. An advantage of the construction of cooling transformer 262 is that it provides for excellent temperature control in the ripening area affected by the larger air circuit 260. The construction is very simple and the cooler/evaporator 240 can work in a greater, more efficient temperature range as compared to conventional ripening rooms. The air temperature of the coolest air in the smaller air circuit 258 can remain much lower than the air temperature in the larger air circuit 260 because the coolest air never touches the bananas. With the flexible mixing of air between the larger and smaller air circuits 260 and 258, a simple to construct system is created for controlling the cooling output capacity. This is a highly efficient, low cost solution to cooling bananas in a banana ripening room 208.

In the illustrated embodiment of FIG. 12, the path of the smaller circuit 258 travels toward cooler 240 via a set of "small" air fans 264, through cooler 240, then into the mixing chamber 266. To enhance air humidity, the small fan 264 is preferably positioned before of air cooler 240 in this smaller air circuit 258, and a heating element (not shown) can be provided to warm the coolant of cooler 240, as was related hereinabove, to improve the humidity in the ripening room.

In the larger circuit 260, the air flows in a path through one or more larger fan(s) 212 in the fan opening in wall 254, into mixing chamber 266, in and through the boxes 204 in the operational area 256, then returning through the fans 212. As can be readily understood from FIG. 12, the portion of the boxes generally marked as the area 219 will receive the hottest return air from the larger air circuit 260 after the cooling air has moved through and exchanged heat with most of the other boxes 204 on its return to the fans 212.

In order to reduce the disparity of cool air between the front and the rear of the ripening room 208, a short length of tarp indicated at 272, and preferably bordering the wall 254, separates the top and the bottom portions of the first few stacks of boxes nearest the rear of room 208. A gap in tarp 272 (at air flow arrows 274) encourages a quantity of cool "bypass air" 274—which makes up a minority percentage (e.g., 20%) of the volume of the larger air flow circuit 260—to immediately flow to the bottom boxes located in the rear area 219 of the room, and thereby cools those boxes. Another length of tarp 272 continues from the gap to the from of room 208. Naturally, the boxes positioned in the front portions of the room 208 will receive the least amount of bypass air 274.

FIG. 13 is a cross-sectional view of FIG. 12 taken along the line 13—13. It illustrates the pyramid stacking arrangement of boxes 204 and the preferred location of fans 212. As can be seen in FIG. 13, the boxes 204 of perishable fruit products are stacked virtually up to the ceiling 206 of ripening room 208. It is preferred that the pyramid-type stacking method be used for the container 208 so that there are gaps between each of the boxes 204 for cooling air to flow up and down the length of container 208.

In FIG. 13, the encircled x's indicated by the numerals 210, for example, represent air that is flowing into the paper for FIG. 13, which also corresponds to air that is flowing to the right as viewed in FIG. 12. This air flow 210 represents the portion of the larger air circuit 260 that exhibits the lowest temperature, since this air has just come form the mixing chamber 266. This air flow direction preferably is restricted to the top half of the stacked bananas, as depicted in FIGS. 12, 13, and 14, and gradually increases in temperature as it flows through the boxes 204 of stacked perishable fruit.

Once the air traveling along the pathways indicated by index numeral 210 reaches the open space designated by the index numeral 259 (see FIG. 12), the air is re-directed by about 180 degrees and then travels from right-to-left on FIG. 12 along the bottom half of the stacked boxes 204. On FIG. 13, this air flow is indicated by encircled dots designated by the index numeral 270. Of course, on FIG. 13, the fans 212 and the wall 254 block the view of the stacked bananas through which this portion of the larger air circuit 260 passes. Naturally, the temperature of the air flowing in this portion of the larger air circuit 260 is greater than the temperatures of the top portion indicated by the index numeral 210.

FIG. 14 is another cross-section view, taken along the line 14—14 on FIG. 12. Since this view is in the opposite direction as compared to FIG. 13, the direction arrows 210 appear as encircled dots, meaning that the air flow is directed out of the paper as viewed in FIG. 14. Correspondingly, the air flow arrows 270 are depicted as encircled x's on FIG. 14, meaning that the air flow is directed into the paper. FIG. 14 also depicts the relatively open frame structure of the pallets at the index numeral 276, which also allows a certain amount of air flow to pass between the frameworks.

In this configuration, the smaller air circuit 258 can significantly cool a small volume of air to effectively cool the air flowing in the larger circuit 260 which, in turn, cools the bananas. This method allows for the use of smaller, lower-energy cooling equipment, fewer high capacity fans, and less mechanical wear on the cooling equipment, as opposed to conventional ripening rooms which require a larger capacity evaporator and more energy to cool the entirety of the air flow going through the ripening room. Furthermore, the cooling system of the present invention can cool a greater quantity of air than cooling systems of equal capacity used in prior art ripening rooms. The present configuration is efficient, simple and cost-effective to construct.

The present invention is also versatile and can be designed to suit various working conditions and refrigeration equipment. For example, some refrigeration systems require a low evaporation temperature and/or are used for deep freeze applications. Such "low temperature" refrigeration systems which transfer heat energy with relatively large temperature differences between the products being cooled and the evaporator would not be suitable for conventional ripening systems because dehydration and undercooling of the perishable products would result. On the contrary, the "cooling transformer" of the present invention allows the use of such "low temperature cooling equipment" in the smaller air circuit 258 for banana ripening.

It will be understood that the operating principles of cooling transformer 262 can be utilized in many cooling applications other than perishable fruit ripening rooms without departing from the principles of the present invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A ripening room, the improvement comprising: an air distribution ceiling having a front end, a rear end, and side edges therebetween; and at least one air passageway positioned along each of said side edges.

2. The ripening room as recited in claim 1, wherein the individual ones of said at least one air passageway become progressively smaller toward said front end.

3. The ripening room as recited in claim 1, wherein the rear end of said air distribution ceiling is positioned at an elevation lower than the elevation of said front end.

4. The ripening room as recited in claim 1, further comprising: a "V"-shaped air distributor positioned above the air distribution ceiling for directing air flow into said at least one air passageway.

5. The ripening room as recited in claim 4, wherein the rear end of said air distribution ceiling is positioned at an elevation lower than the elevation of said front end, and wherein the individual ones of said at least one air passageway become progressively smaller toward the front end.

6. A ripening room, the improvement comprising: an air distribution ceiling having a front end, a rear end, and side edges therebetween; and an elongated air passageway positioned along each of said side edges.

7. The ripening room as recited in claim 6, wherein the rear end of said air distribution ceiling is positioned at an elevation lower than the elevation of said front end.

8. The ripening room as recited in claim 6, further comprising: a "V"-shaped air distributor positioned above the air distribution ceiling for directing air flow into said at least one air passageway.

9. The ripening room as recited in claim 8, wherein the rear end of said air distribution ceiling is positioned at an elevation lower than the elevation of said front end, and wherein said at least one elongated air passageway comprises a slot having its longitudinal dimension traversing substantially the distance between said front and rear ends.

* * * * *